(12) United States Patent
Lim et al.

(10) Patent No.: US 12,176,826 B2
(45) Date of Patent: Dec. 24, 2024

(54) INVERTER DRIVING APPARATUS AND CONTROL METHOD THEREOF

(71) Applicants: Hyundai Motor Company, Seoul (KR); Kia Corporation, Seoul (KR)

(72) Inventors: Hyun Jae Lim, Hwaseong-si (KR); Yong Jae Lee, Yongin-si (KR); Young Ho Chae, Gwangmyeong-si (KR); Young Kwan Ko, Seoul (KR); Young Gi Lee, Ansan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 263 days.

(21) Appl. No.: 17/985,416

(22) Filed: Nov. 11, 2022

(65) Prior Publication Data
US 2024/0097580 A1    Mar. 21, 2024

(30) Foreign Application Priority Data
Sep. 15, 2022   (KR) .................. 10-2022-0116488

(51) Int. Cl.
*H02M 7/5387* (2007.01)
*H02M 1/08* (2006.01)
(Continued)

(52) U.S. Cl.
CPC ......... *H02M 7/53876* (2021.05); *H02M 1/08* (2013.01); *H02M 1/385* (2021.05); *H02M 7/5395* (2013.01); *H02P 27/08* (2013.01)

(58) Field of Classification Search
CPC .... H02M 7/53876; H02M 1/08; H02M 1/385; H02M 7/5395; H02P 27/08
See application file for complete search history.

(56) References Cited

U.S. PATENT DOCUMENTS 7,471,526 B2    12/2008   Welchko et al.
9,590,540 B2    3/2017    Wu et al.
(Continued)

FOREIGN PATENT DOCUMENTS

| KR | 10-2014-0066063 A | 5/2014 |
| KR | 10-2009512 B1 | 8/2019 |
| KR | 10-2220644 B1 | 2/2021 |

*Primary Examiner* — Kyle J Moody
(74) *Attorney, Agent, or Firm* — Morgan, Lewis & Bockius LLP

(57) ABSTRACT

An inverter driving apparatus includes an inverter having a plurality of legs respectively corresponding to each of a plurality of phases and the control unit generating space vector modulation signals based on a phase voltage command, each of the space vector modulation signals corresponding to each of the plurality of phases, respectively, determining whether an output voltage of the inverter corresponding to at least one space vector modulation signal of the space vector modulation is in a non-linear region by determining whether each voltage of the space vector modulation signals is included in a predetermined range, generating a terminal voltage command by determining whether or not to apply an offset voltage to each of the space vector modulation signals based on the determination of the non-linear region, and controlling a turn-on state of at least one switch included in each of the plurality of legs by modulating the terminal voltage command based on pulse width modulation.

19 Claims, 9 Drawing Sheets

(51) Int. Cl.
*H02M 1/38* (2007.01)
*H02M 7/5395* (2006.01)
*H02P 27/08* (2006.01)

(56) References Cited

U.S. PATENT DOCUMENTS

| | | | |
|---|---|---|---|
| 9,641,121 B2* | 5/2017 | Shimomugi | H02P 27/085 |
| 10,281,185 B2* | 5/2019 | Uemura | H02P 27/08 |
| 10,833,605 B2 | 11/2020 | Woodburn | |
| 2012/0163046 A1* | 6/2012 | Hibino | H02P 27/08 363/37 |

* cited by examiner

FIG. 6

| Vmax3_ref | Vmax2_ref + Vdt_comp |
| --- | --- |
| Vmid3_ref | Vmid2_ref - Vdt_comp |
| Vmin3_ref | Vmin2_ref + Vdt_comp |

INVERTER DRIVING APPARATUS AND CONTROL METHOD THEREOF

CROSS REFERENCE TO RELATED APPLICATION

The present application claims priority to Korean Patent Application No. 10-2022-0116488, filed on Sep. 15, 2022 in the Korean Intellectual Property Office, the entire contents of which is incorporated herein for all purposes by this reference.

TECHNICAL FIELD

The present disclosure relates to an inverter driving apparatus and a method of controlling the apparatus configured to improve linearity between a voltage command for the inverter and an output voltage of the inverter.

BACKGROUND

An inverter is a component converting the DC voltage of a high-voltage battery into the AC voltage to drive the motor. A method of operating a switch inside the inverter includes a pulse width modulation (PWM) method.

The PWM method includes a space vector pulse width modulation (SVPWM) method and a discontinuous pulse width modulation (DPWM) method. Here, the SVPWM method is one of the continuous modulation methods, and unlike the sinusoidal pulse width modulation (SPWM) method by which 3-phase voltage commands are individually modulated, is a technique of modulating the voltage commands into an active voltage vector and a null voltage vector with a single voltage command expressed in a complex space as a reference space vector. The DPWM method is a discontinuous modulation method and is a technique for modulating 2-phase voltage commands only.

On the other hand, the pulse width of a PWM signal may be limited by a minimum pulse width (MPW) condition. The MPW condition refers to a condition for the minimum pulse width to ensure that the switch provided in the inverter remains in the turn-on and turn-off states for a predetermined time in one duty cycle.

When the pulse width of the PWM signal does not satisfy the PWM condition, the voltage command for the inverter and the output voltage of the inverter may be in a non-linear region. In this case, the problems are that the phase voltage outputted from the inverter is distorted and that the noise generated when the motor is driven increases.

The matters described above as a background of the present disclosure are intended only for a better understanding of the background of the present disclosure and are not to be taken as acknowledgment that they pertain to the conventional art already known to those skilled in the art.

SUMMARY

A technical object of the present disclosure is to improve the linearity between a voltage command of an inverter and an output voltage of the inverter.

Technical objects to be achieved by the present disclosure are not limited to the technical objects described above, and other technical objects not described will be clearly understood by those skilled in the art to which the present disclosure pertains.

According to an embodiment of the present disclosure, an inverter driving apparatus may include an inverter having a plurality of legs respectively corresponding to each of a plurality of phases and the control unit generating space vector modulation signals respectively corresponding to each of the plurality of phases based on a phase voltage command, determining whether an output voltage of the inverter corresponding to at least one space vector modulation signal of the space vector modulation signals is in a non-linear region according to whether each voltage of the space vector modulation signals is included in a predetermined range, generating a terminal voltage command upon deciding whether or not to apply an offset voltage to each of the space vector modulation signals based on the determination results, and controlling a turn-on state of at least one switch included in each of the plurality of legs by modulating the terminal voltage command through pulse width modulation.

In addition, according to an embodiment of the present disclosure, a method of controlling the inverter driving apparatus may include generating space vector modulation signals, each of the plurality of legs corresponding to each of a plurality of phases based on a phase voltage command, respectively, determining whether an output voltage of the inverter corresponding to at least one space vector modulation signal of the space vector modulation signals is in a non-linear region by determining whether each voltage of the space vector modulation signals is in a predetermined range, generating a terminal voltage command by determining whether or not to apply an offset voltage to each of the space vector modulation signals based on the determination of the non-linear region, and controlling a turn-on state of a switch included in the inverter by modulating the terminal voltage command based on pulse width modulation.

According to the present disclosure, improving the linearity between the voltage command for the inverter and the output voltage of the inverter may alleviate the distortion of the phase voltage outputted from the inverter and reduce the noise generated when the motor is driven.

The effects achievable by the present disclosure are not limited to the effects described above, and the effects not described may be clearly understood by those skilled in the art to which the present disclosure pertains.

BRIEF DESCRIPTION OF THE DRAWINGS

FIG. 6 is a table for describing a compensation voltage due to the dead time according to an embodiment of the present disclosure.

DETAILED DESCRIPTION OF THE DISCLOSURE

Figure 1:
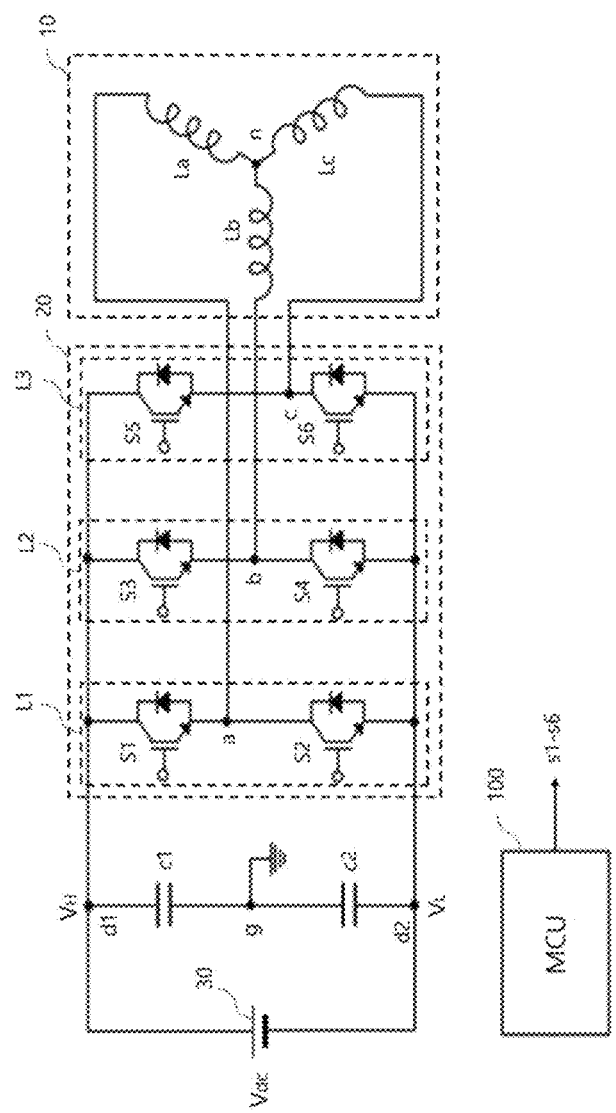
FIG. 1 is a view illustrating an exemplary configuration of an inverter driving apparatus in a motor driving system according to an embodiment of the present disclosure.

The embodiment disclosed in the present specification will be described in detail with reference to the accompanying drawings. However, the same or similar components will be given the same reference numerals irrespective of the drawing numbers, and the repetitive descriptions will be omitted. The suffixes "module" and "unit" for the components used in the following description are given or interchangeably used only in consideration of the ease of writing the specification and do not have meanings or roles distinct from each other by themselves. When it is determined that the specific description of the related and already known technology may obscure the gist of the embodiments disclosed in the specification, the specific description will be omitted. Further, it is to be understood that the accompanying drawings are for a better understanding of the embodiment disclosed in the present specification and that the technical ideas disclosed in the present specification are not limited by the accompanying drawings and include all the modifications, equivalents, or substitutes included in the spirit and technical scope of the present disclosure.

The terms including ordinal numbers such as first, second, and the like may be used to describe various components, but the components are not to be limited by the terms. The terms may only be used for the purpose of distinguishing one component from the other.

It is to be understood that when a component is referred to as being "connected" or "coupled" to another component, the component may be directly connected or coupled to the another component, but other components may exist in between. In contrast, when a component is referred to as being "directly connected" or "directly coupled" to another component, it is to be understood that there are no intervening components present.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof in advance.

Further, a unit or control unit included in the names such as a motor control unit (MCU), a hybrid control unit (HCU), and the like is a term only used in the naming of a controller that controls a specific function of a vehicle only and does not mean a generic function unit. For example, each control unit may include a communication device communicating with other control units or sensors to control the functions it is responsible for, a memory storing an operating system, logic commands, and input/output information, and one or more processors executing determination, calculation, and decision, and the like needed for controlling the functions it is responsible for.

FIG. 1 is a view illustrating an exemplary configuration of an inverter driving apparatus in a motor driving system according to an embodiment of the present disclosure. As illustrated in FIG. 1, a motor driving system may include a motor 10, an inverter 20, a battery 30, and a motor control unit 100.

According to an exemplary embodiment of the present disclosure, the motor control unit 100 may include a processor (e.g., computer, microprocessor, CPU, ASIC, circuitry, logic circuits, etc.) and an associated non-transitory memory storing software instructions which, when executed by the processor, provides the functionalities of the motor control unit 100. Herein, the memory and the processor may be implemented as separate semiconductor circuits. Alternatively, the memory and the processor may be implemented as a single integrated semiconductor circuit. The processor may embody one or more processor(s).

The motor 10 may have a plurality of windings La, Lb, Lc respectively corresponding to each of a plurality of phases. One ends of the plurality of windings may be short-circuited to each other to form a neutral point n and the other ends of the plurality of windings La, Lb, Lc may be respectively connected to each of the AC links a, b, c of the inverter 20.

The inverter 20 may include a plurality of legs L1, L2, L3 respectively corresponding to each of a plurality of phases. The plurality of legs L1, L2, L3 may respectively include switches S1, S2, switches S3, S4, and switches S5, S6. Each of the plurality of legs L1, L2, L3 may be connected to DC links d1, d2 to receive a DC voltage Vdc from the battery 30 and may convert the Vdc into an AC voltage corresponding to each of the plurality of phases and provide the AC voltage to the AC links a, b, c to drive the motor 10.

A capacitor c1 may be connected to a ground terminal g and a first DC link d1, and a capacitor c2 may be connected to the ground terminal g and a second DC link d2. The voltage of the first DC link d1 may have VH (Vdc/2) and the voltage of the second DC link d2 may have VL (−Vdc/2).

The motor control unit 100 may calculate a phase voltage command for the inverter 20 based on the required torque for the motor 10, and then calculate a terminal voltage command for the inverter 20 from the phase voltage command based on the symmetric space vector modulation (symmetric SVM). Here, the phase voltage corresponds to a potential difference between the neutral point n and the AC links a, b, c, and the terminal voltage corresponds to a potential difference between the ground terminal g and the AC links a, b, c.

The motor control unit 100 may modulate the terminal voltage command through pulse width modulation (PWM) to generate a PWM signal, and then limit the pulse width of the PWM signal based on minimum pulse width (hereinafter referred to as MPW) to output switching signals s1-s6. The motor control unit 100 may drive the inverter 20 by controlling the turn-on state of the switches S1-S6 included in the plurality of legs L1, L2, L3 based on the switching signals s1-s6.

An MPW condition refers to a condition on the minimum pulse width of the switching signals s1-s6 for the switches S1-S6 to remain in the turn-on and turn-off states for a predetermined time in one duty cycle so that the motor control unit 100 may detect a short-circuit state between the motor 10 and the inverter 20.

When the pulse width of the PWM signal does not satisfy the MPW condition, the motor control unit 100 limits the pulse width of the PWM signal to output the switching signals s1-s6 such that the terminal voltage command for the inverter and the output voltage of the inverter 20 may have non-linearity. This will be described with reference to FIG. 2.

Figure 2:
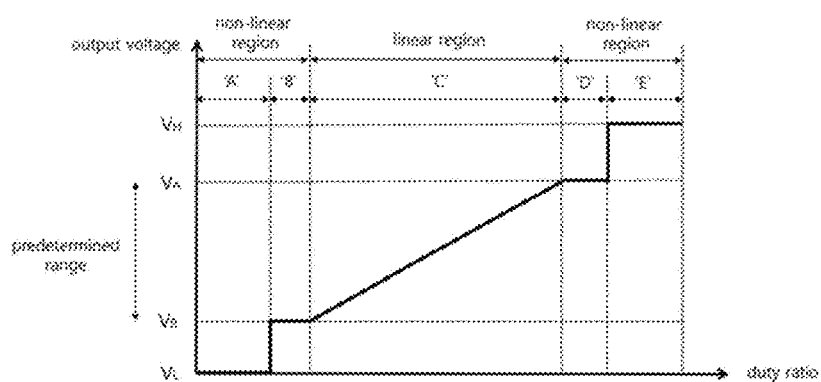
FIG. 2 is a graph for describing a relationship between a duty ratio of a pulse width modulation signal according to a terminal voltage command and an output voltage of an inverter according to an embodiment of the present disclosure.

FIG. 2 is a graph for describing a relationship between a duty ratio of a PWM signal according to the terminal voltage command and the output voltage of an inverter.

FIG. 2 shows that 'C' corresponds to a case where the terminal voltage command for the inverter is included in the predetermined range (between VA and VB). Since 'C' corresponds to a case where the pulse width of the PWM signal satisfies the MPW condition, the duty ratio of the PWM signal according to the terminal voltage command and the output voltage of the inverter may be in a linear region.

In the case of 'A' and 'B' where the terminal voltage command for the inverter is lower than the predetermined range, the duty ratio of the PWM signal and the output voltage of the inverter may be in a non-linear region. 'A' and 'B' correspond to a case where the pulse width of the PWM signal does not satisfy MPW condition for the switches provided in the inverter to remain in the turn-on state for a predetermined time. For example, 'A' corresponds to a case where the pulse width of the PWM signal according to the terminal voltage command is equal to or less than half the MPW, and 'B' corresponds to a case where the pulse width of the PWM signal exceeds half the MPW but is equal to or less than MPW. In 'A', the motor control unit 100 may remove the pulse width of the PWM signal to output a switching signal. At this time, the output voltage of the inverter may be outputted at VL. In 'B', the motor control unit 100 may adjust the pulse width of the PWM signal to the MPW to output a switching signal. At this time, the output voltage of the inverter may be outputted at VB.

Similarly, in the case of 'D' and 'E' where the terminal voltage command for the inverter is higher than the predetermined range, the duty ratio of the PWM signal and the output voltage of the inverter may be in a non-linear region. 'D' and 'E' correspond to a case where the pulse width of the PWM signal does not satisfy the MPW condition for the switches provided in the inverter to remain in the turn-off state for a predetermined time.

As described above, when the pulse width of the PWM signal does not satisfy the MPW condition, the terminal voltage command for the inverter and the output voltage of the inverter may be in the non-linear region. In this case, the problems are that the phase voltage outputted from the inverter is distorted and that the noise generated when the motor is driven increases.

Figure 3:
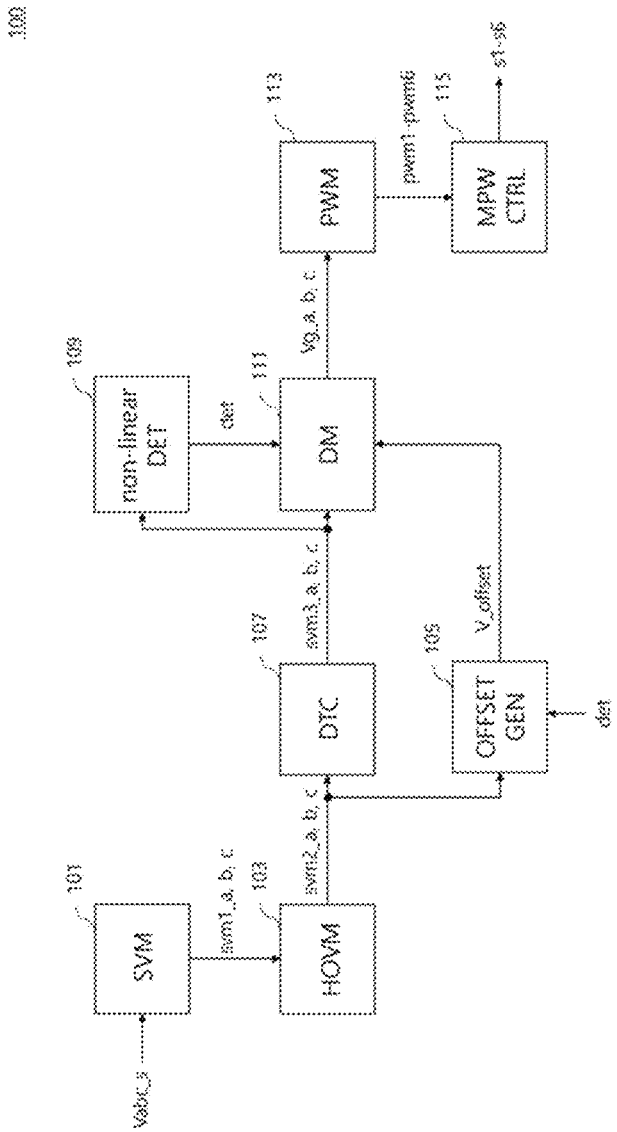
FIG. 3 is a block diagram illustrating an exemplary configuration of a motor control unit according to an embodiment of the present disclosure.

Accordingly, the present embodiment proposes an inverter driving apparatus configured to improve the linearity between the terminal voltage command for the inverter and the output voltage of the inverter by applying an offset voltage for discontinuous modulation to the terminal voltage command in the non-linear region. FIG. 3 illustrates a configuration serving this purpose.

FIG. 3 is a block diagram illustrating an exemplary configuration of the motor control unit 100 according to an embodiment of the present disclosure. As illustrated in FIG. 3, the motor control unit 100 may include a space vector modulator 101, an overmodulation controller 103, an offset generator 105, a dead time compensator 107, a non-linear region detector 109, a discontinuous modulator 111, a pulse width modulator 113, and an MPW controller 115.

The motor control unit 100 may sequentially perform the space vector modulation for the phase voltage command Vabc_s, the overmodulation, and the compensation for output voltage error of the inverter due to dead time to generate space vector modulation signals sym3_a, b, c. Then, the motor control unit 100 may determine whether the output voltage of the inverter corresponding at least one space vector modulation signal is in the non-linear region according to whether each voltage of the space vector modulation signals is included in the predetermined range and generate a terminal voltage commands Vg_a, b, c upon deciding whether or not to apply the offset voltage V_offset for discontinuous modulation according to the determination results. Finally, the motor control unit 100 may modulate the terminal voltage commands Vg_a, b, c, through PWM to generate the PWM signals pwm1-pwm6 and limit the pulse width of the pulse width modulation signals pwm1-pwm6 according to the MPW condition to output the switching signals s1-s6.

Accordingly, the motor control unit 100 may output the switching signals s1-s6 modulated through the space vector pulse width modulation when the output voltage of the inverter is determined to be in the linear region and output the switching signals s1-s6 modulated through the discontinuous pulse width modulation when the output voltage of the inverter corresponding at least one space vector modulation signal is determined to be in the non-linear region.

Each component included in the motor control unit 100 will be described in the following.

The space vector modulator 101 may generate the first space vector modulation signals svm1_a, b, c corresponding to each of a plurality of phases through symmetric space vector modulation with the phase voltage command Vabc_s as a reference space vector. The space vector modulation is a technique of modulating one reference space vector expressed in a complex space into an active voltage vector and a null voltage vector, and the symmetric space vector modulation is a space vector modulation technique of symmetrically disposing the active voltage vector and the null voltage vector in one sampling cycle.

Figure 4:
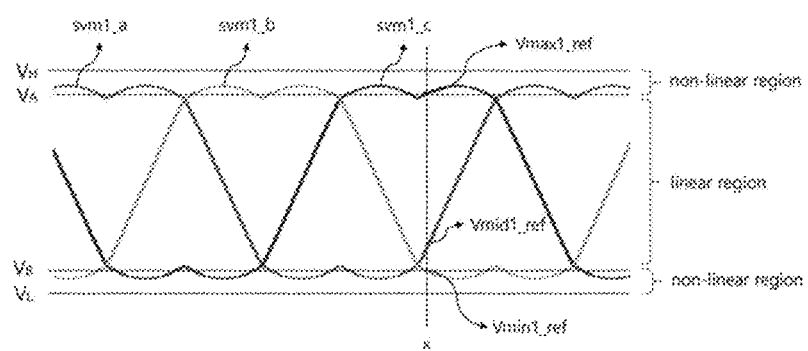
FIG. 4 is a waveform diagram of a space vector modulation signal obtained by modulating a phase voltage command through symmetric space vector modulation according to an embodiment of the present disclosure.

FIG. 4 illustrates a waveform of each of the first space vector modulation signals sym1_a, b, c. At a predetermined time 'x', the voltages of the first space vector modulation signals svm1_a, b, c may be expressed as the maximum voltage Vmax1_ref, the middle voltage Vmid1_ref, and the minimum voltage Vmin_ref depending on the voltage level. In FIG. 4, since the section in which the Vmax1_ref is equal to or greater than VA or Vmin1_ref is equal to or less than VB corresponds to the non-linear region, direct modulation of the first space vector modulation signals sym1_a, b, c through PWM distorts the phase voltage outputted from the inverter.

FIG. 3 shows that the overmodulation controller 103 may determine whether overmodulation control is required based on the first space vector modulation signals svm1_a, b, c. When it is determined that the overmodulation control is required, the overmodulation controller 103 may modify the waveform of the first space vector modulation signals svm1_a, b, c to output second space vector modulation signals sym2_a, b, c. In contrast, when it is determined that the overmodulation control is not required, the overmodulation controller 103 may output the first space vector modulation signals sym1_a, b, c as the second space vector modulation signals sym2_a, b, c without modifying the waveform of the first space vector modulation signals svm1_a, b, c.

The offset generator 105 may generate the offset voltage V_offset for discontinuous modulation based on the second space vector modulation signals sym2_a, b, c. Discontinuous modulation is a technique of applying the offset voltage V_offset to an input wave such that the switching states of the switches provided in the inverter do not transition in a predetermined section including a time at which the input wave has a maximum voltage or a minimum voltage.

Non-transition of the switching state in a predetermined section means that the switching remains in a turn-on state or a turn-off state in the predetermined section. That is, the offset generator 105 may set the level of offset voltage V_offset to the difference between the voltage VH of the first DC link (d1 in FIG. 1) and the maximum voltage of the second space vector modulation signals sym2_a, b, c or to the difference between the voltage VL of the second DC link (d2 in FIG. 2) and the minimum voltage of the second space vector modulation signals sym2_a, b, c.

More specifically, the offset generator 105 may calculate the maximum voltage and/or minimum voltage for the second space vector modulation signals sym2_a, b, c serving as parameters for setting the offset voltage V_offset based on the second space vector modulation signals sym2_a, b, c. Then, when a detection signal det is activated in the non-linear region, the offset generator 105 may set the offset voltage V_offset to the difference between the voltage VH of the first DC link (d1 in FIG. 1) and the maximum voltage of the second space vector modulation signals sbm2_a, b, c and/or the difference between the voltage VL of the second DC link (d2 in FIG. 1) and the minimum voltage of the second space vector modulation signals sym2_a, b, c.

On the other hand, when the switching state is maintained in a predetermined section during discontinuous modulation, the dead time, to be described below, does not apply in the predetermined section. Accordingly, the offset generator 105 preferably generates the offset voltage V_offset based on the second space vector modulation signals sym2_a, b, c to which the output voltage compensation due to the dead time is not applied.

The dead time compensator 107 may apply the compensation voltage due to the dead time to the second space vector modulation signals sym2_a, b, c to output third space vector modulation signals sym3_a, b, c.

Dead time refers to a minimum amount of time for the switches to remain in the turn-off state so as to prevent the simultaneous turn-on of the switches that are operated in a complementary way due to a switching delay.

Figure 5:
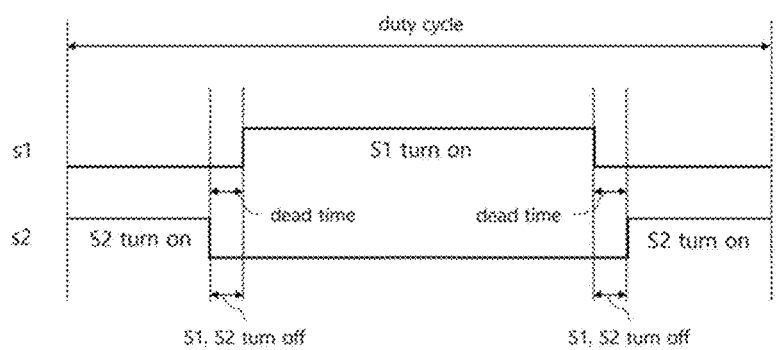
FIG. 5 is a diagram for describing dead time according to an embodiment of the present disclosure.

FIG. 5 illustrates logic levels of two switching signals s1, s2 for respectively operating the two switches (S1, S2 in FIG. 1) included in the first leg (L1 in FIG. 1). When dead time elapses after the switch S2 switches from the turn-on state to the turn-off state by the switching signal s2, the switch S1 is turned on by the switching signal s1. Further, when dead time elapses after the switch S1 switches from the turn-on state to the turn-off state by the switching signal s1, the switch S2 is turned on by the switching signal s2.

The switches complementarily operated are all turned off during the dead time, resulting in an error between the voltage command for the inverter and the output voltage of the inverter, so that the dead time compensator 105 is required to apply voltage for compensating for the error occurring during the dead time to the second space vector modulation signals svm2_a, b, c in advance.

FIG. 6 shows a compensation voltage Vdt_comp due to the dead time. The dead time compensator 105 may calculate the maximum voltage Vmax3_ref, middle voltage Vmid3_ref, and minimum voltage Vmin3_ref for the third space vector modulation signals svm3_a, b, c by applying the compensation voltage Vdt_comp due to the dead time to each of the maximum voltage Vmax2_ref, middle voltage Vmid2_ref, and minimum voltage Vmin2_ref for the second space vector modulation signals svm2_a, b, c.

FIG. 3 shows that the non-linear region detector 109 may determine whether the output voltage of the inverter corresponding at least one third space vector modulation signal is in the non-linear region according to whether the maximum voltage and the minimum voltage of the third space vector modulation signals svm3_a, b, c, are included in the predetermined range and activate or deactivate the detection signal det according to the determination results. More specifically, when the maximum voltage and the minimum voltage of the third space vector modulation signals svm3_a, b, c are included in the predetermined range, the non-linear region detector 109 may determine that the output voltage of the inverter corresponding the third space vector modulation signals svm3_a, b, c is in the linear region and deactivate the detection signal det. In contrast, when the maximum voltage and minimum voltage of the third space vector modulation signals sym3_a, b, c are not included in the predetermined range, the non-linear region detector 109 may determine that the output voltage of the inverter corresponding at least one third space vector modulation signal is in the non-linear region and activate the detection signal det.

The discontinuous modulator 111 may output the terminal voltage commands Vg_a, b, c upon deciding whether or not to apply the offset voltage V_offset for discontinuous modulation to the third space vector modulation signal sym3_a, b, c based on the detection signal det. More specifically, when the detection signal det is deactivated (that is, in the linear region), the discontinuous modulator 111 may output the third space vector modulation signals sym3_a, b, c as the terminal voltage commands Vg_a, b, c without applying the offset voltage V_offset. In contrast, when the detection signal det is activated (that is, in the non-linear region), the discontinuous modulator 111 may apply the offset voltage V_offset to each of the third space vector modulation signals sym3_a, b, c to output the terminal voltage commands Vg_a, b, c.

Discontinuous modulation includes 60° discontinuous modulation and 120° discontinuous modulation.

In the 60° discontinuous modulation, the offset voltage V_offset may include a first offset voltage and second offset voltage. The first offset voltage may be set to the difference between the voltage VH of the first DC link (d1 in FIG. 1) and the maximum voltage of the second space vector modulation signals sym2_a, b, c, and the second offset voltage may be set to the difference between the voltage VL of the second DC link (d2 in FIG. 1) and the minimum voltage of the second space vector modulation signals sym2_a, b, c. When the detection signal det is deactivated in the 60° discontinuous modulation, the discontinuous modulator 111 may alternately apply the first offset voltage and second offset voltage to each of the third space vector modulation signals sym3_a, b, c at 60° phase intervals to output the terminal voltage commands V1_a, b, c.

In the 120° discontinuous modulation, the offset voltage V_offset may be set to the difference between the voltage VH of the first DC link (d1 in FIG. 1) and the maximum voltage of the second space vector modulation signals sym2_a, b, c or to the difference between the voltage VL of the second DC link (d2 in FIG. 1) and the minimum voltage of the second space vector modulation signals sym2_a, b, c according to an embodiment. When the detection signal det is activated in the 120° discontinuous modulation, the discontinuous modulator 111 may apply the offset voltage V_offset to each of the third space vector modulation signals sym3_a, b, c at 120° phase intervals to output the terminal voltage commands Vg_a, b, c.

Figure 7:
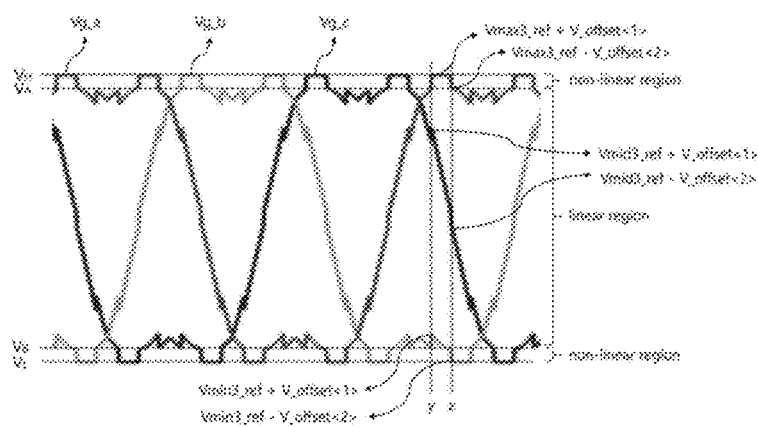
FIG. 7 is a waveform diagram of a terminal voltage command to which an offset voltage for discontinuous modulation is applied according to an embodiment of the present disclosure.

FIG. 7 illustrates the waveform of each of the terminal voltage commands Vg_a, b, c to which the offset voltage V_offset is applied. The discontinuous modulator 111 may add the first offset voltage V_offset<1> to the maximum voltage Vmax3_ref, middle voltage Vmid3_ref, and minimum voltage Vmin3_ref for the third space vector modulation signals sym3-a, b, c at a predetermined time 'y'. Here, the first offset voltage V_offset<1> may be set to the difference between the voltage VH of the first DC link (d1 in FIG. 1) and the maximum voltage of the second space vector modulation signals sym2_a, b, c.

In addition, the discontinuous modulator 111 may subtract the second offset voltage V_offset<2> from the maximum voltage Vmax3_ref, middle voltage Vmid3_ref, and minimum voltage Vmin3_ref for the third space vector modulation signals sym3_a, b, c at a predetermine time 'z'. Here, the second offset voltage V_offset<2> may be set to the difference between the voltage VK of the second DC link (d2 in FIG. 1) and the minimum voltage of the second space vector modulation signals sym2_a, b, c.

When the offset voltage V_offset is applied as in FIG. 7, at least one of the maximum voltage and minimum voltage of the terminal voltage commands Vg_a, b, c is included in the linear region so that the linearity between the terminal voltage commands Vg_a, b, c and the output voltage of the inverter may be improved.

FIG. 7 illustrates an example of alternately applying the first offset voltage V_offset<1> and second offset voltage V_offset<2> to the voltage of the third space vector modulation signals sym3_a, b, c at predetermined phase intervals. However, the waveform of each of the terminal voltage commands Vg_a, b, c in FIG. 7 is exemplary, and the phase intervals at which the offset voltage V_offset is applied and the level of the offset voltage V_offset may be variously set according to embodiments.

FIG. 3 shows that the pulse width modulator 113 may modulate each of the terminal voltage commands Vg_a, b, c through PWM to output PWM signals pwm1-pwm6.

The MPW controller 115 may output the switching signals s1-s6 upon deciding whether or not to limit the pulse width of the PWM signals pwm1-pwm6 according to the MPW condition.

Figure 8:
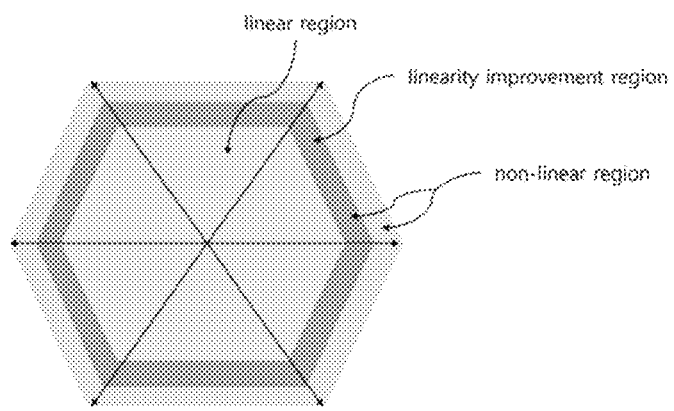
FIG. 8 is a diagram illustrating an exemplary space vector hexagon according to an embodiment of the present disclosure.

FIG. 8 is a view illustrating an exemplary space vector hexagon according to an embodiment of the present disclosure. FIG. 8 shows that the linear region of the space vector hexagon corresponds to 'C' in FIG. 2 and that the non-linear region of the space vector hexagon corresponds to 'A', 'B', 'D', and 'E' in FIG. 2. According to the embodiment of the present disclosure, the application of the offset voltage V_offset for discontinuous modulation in the non-linear region may improve the linearity between the terminal voltage command for the inverter and the output voltage of the inverter in a linearity improvement region.

Figure 9:
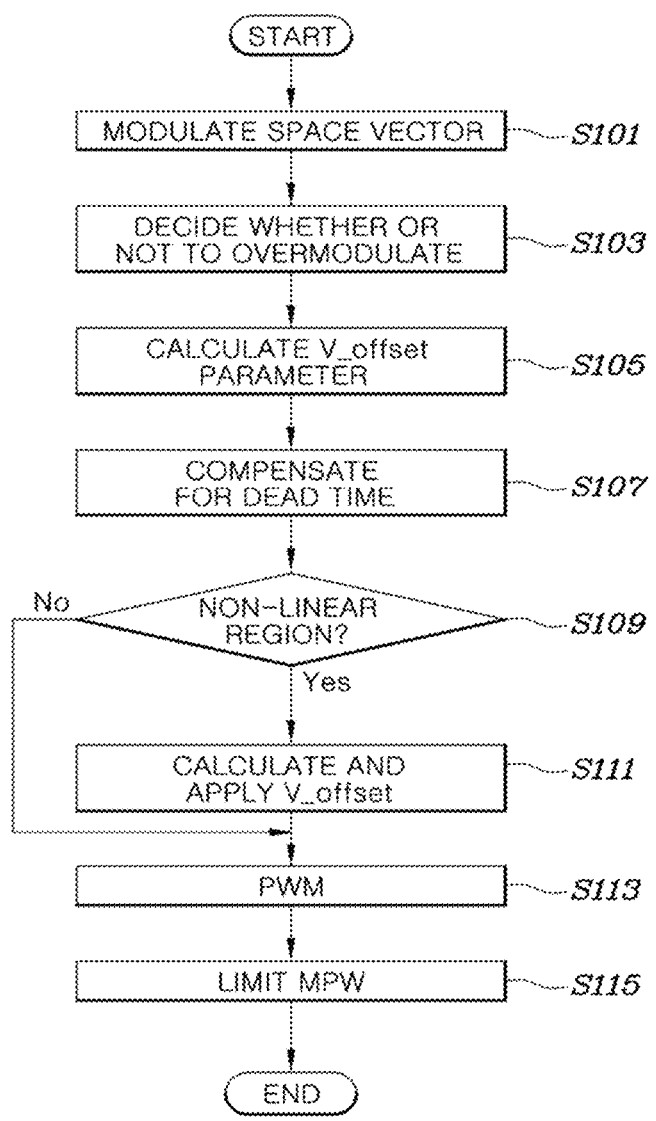
FIG. 9 is a flowchart for describing a method of controlling an inverter driving apparatus according to an embodiment of the present disclosure.

FIG. 9 is a flowchart for describing a method of controlling an inverter driving apparatus according to an embodiment of the present disclosure.

The space vector modulator 101 may generate the first space vector modulation signals svm1_a, b, c corresponding to each of the plurality of phases through symmetric space vector modulation with the phase voltage command Vabc_s as a reference space vector (S101).

The overmodulation controller 103 may output the second space vector modulation signals sym2_a, b, c upon deciding whether or not to overmodulate the first space vector modulation signals svm1_a, b, c (S103), and the offset generator 105 may calculate the maximum voltage and/or minimum voltage for the second space vector modulation signals sym2_a, b, c serving as parameters for setting the offset voltage V_offset based on the second space vector modulation signals sym2_a, b, c (S105).

The dead time compensator 107 may apply a compensation voltage due to dead time to the second space vector modulation signals sym2_a, b, c to output the third space vector modulation signals sym3_a, b, c (S107), and the non-linear region detector 109 may determine whether the output voltage of the inverter is in the non-linear region according to whether the maximum voltage and minimum voltage of the third space vector modulation signals sym3_a, b, c are included in a preset range (S109).

When the output voltage of the inverter is determined to be in the non-linear region (YES in S109), the offset generator 105 may calculate the offset voltage V_offset for discontinuous modulation based on the parameters calculated in S105. Then, the discontinuous modulator 111 may apply the calculated offset voltage V_offset to each of the third space vector modulation signals smv3_a, b, c to output the terminal voltage commands Vg_a, b, c (S111).

When the output voltage of the inverter is determined to be in the linear region (NO in S109), the discontinuous modulator 111 may output the third space vector modulation signals sym3_a, b, c as the terminal voltage commands Vg_a, b, c without applying the offset voltage V_offset (S111).

Then, the pulse width modulator 113 may modulate each of the terminal voltage commands Vg_a, b, c through PWM to output the pulse width modulation signals pwm1-pwm6 (S113), and the MPW controller 115 may output the switching signals s1-s6 for controlling the turn-on state of the switches S1-S6 included in the inverter 20 upon deciding whether or not to limit the pulse width of the pulse width modulation signals pwm1-pwm6 according to the MPW condition (S115).

On the other hand, the present disclosure described above may be implemented as a computer-readable code in a medium in which a program is recorded. The computer-readable medium includes all kinds of recording devices in which data readable by a computer system is stored. An example of the computer-readable medium includes a hard disk drive (HDD), a solid state disk (SSS), a silicon disk drive (SDD), ROM, RAM, CD-ROM, magnetic tape, a floppy disk, an optical data storage device, and the like. Accordingly, the above-detailed description is not to be construed as restrictive in any respect but is to be considered exemplary. The scope of the present disclosure is to be determined by a reasonable interpretation of the appended claims, and all modifications within the equivalent scope of the present disclosure are included in the scope of the present disclosure.

What is claimed is:

1. An inverter driving apparatus comprising:
    an inverter including a plurality of legs, each of the plurality of legs corresponding to each of a plurality of phases, respectively; and
    a control unit generating space vector modulation signals based on a phase voltage command, each of the space vector modulation signals corresponding to each of the plurality of phases, respectively, determining whether an output voltage of the inverter corresponding to at least one space vector modulation signal of the space vector modulation signals is in a non-linear region by determining whether each voltage of the space vector modulation signals is included in a predetermined range, generating a terminal voltage command by determining whether or not to apply an offset voltage to each of the space vector modulation signals based on the determination of the non-linear region, and controlling a turn-on state of at least one switch included in each of the plurality of legs by modulating the terminal voltage command based on pulse width modulation.

2. The apparatus of claim 1, wherein the control unit outputs a switching signal for controlling the turn-on state of the at least one switch by modulating the terminal voltage command, wherein in response to the determination of the non-liner region that the output voltage is in a linear region, the control unit outputs the switching signal modulated based on space vector pulse width modulation and in response to the determination of the non-liner region that the output voltage is in the non-linear region, the controller outputs the switching signal modulated based on discontinuous pulse width modulation.

3. The apparatus of claim 1, wherein the control unit includes a space vector modulator generating the space vector modulation signals based on symmetric space vector modulation with the phase voltage command as a reference space vector.

4. The apparatus of claim 1, wherein the control unit determines whether the output voltage of the inverter is in the non-linear region by determining whether the maximum voltage and the minimum voltage of the space vector modulation signals are included in the predetermined range.

5. The apparatus of claim 1, wherein the control unit determines that the output voltage of the inverter in the non-linear region when a voltage level of the at least one space vector modulation signal is not included in the predetermined range and applies the offset voltage for discontinuous modulation to each of the space vector modulation signals.

6. The apparatus of claim 5, wherein
the offset voltage for discontinuous modulation includes a first offset voltage and a second offset voltage, and
in response to the determination of the non-linear region that the output voltage of the inverter is in the non-linear region, the control unit alternately applies the first offset voltage and the second offset voltage to the each of the space vector modulation signals at 60° phase interval, wherein the control unit sets the first offset voltage to a difference between a voltage of a first DC link of the inverter and a maximum voltage of the space vector modulation signals and sets the second offset voltage to a difference between a voltage of a second DC link of the inverter and a minimum voltage of the space vector modulation signals.

7. The apparatus of claim 5, wherein in response to the determination of the non-linear region that the output voltage of the inverter is in the non-linear region, the control unit applies the offset voltage to each of the space vector modulation signals at 120° phase interval, wherein the control unit sets the offset voltage to a difference between a voltage of a DC link of the inverter and the maximum voltage or the minimum voltage of the space vector modulation signals.

8. The apparatus of claim 1, wherein the control unit includes a dead time compensator applying a compensation voltage due to dead time to the space vector modulation signals.

9. The apparatus of claim 8, wherein the control unit further includes an offset generator generating the offset voltage based on the space vector modulation signals to which the compensation voltage due to dead time is not applied.

10. The apparatus of claim 1, wherein the control unit includes a pulse width modulator modulating the terminal voltage command based on the pulse width modulation to output a pulse width modulation signal and an MPW controller outputting a switching signal for controlling the turn-on state of the at least one switch by determining whether or not to limit the pulse width of the pulse width modulation signal according to a minimum pulse width condition.

11. A method of controlling an inverter driving apparatus, the method comprising:
generating space vector modulation signals based on a phase voltage command, each of the space vector modulation signals corresponding to each of a plurality of phases, respectively;
determining whether an output voltage of the inverter corresponding to at least one space vector modulation signal of the space vector modulation signals is in a non-linear region by determining whether each voltage of the space vector modulation signals is included in a predetermined range;
generating a terminal voltage command by determining whether or not to apply an offset voltage to each of the space vector modulation signals based on the determination of the non-linear region; and
controlling a turn-on state of a switch included in the inverter by modulating the terminal voltage command based on pulse width modulation.

12. The method of claim 11, wherein the modulating the terminal voltage command based on pulse width modulation comprises: outputting a switching signal for controlling the turn-on state of the switch, wherein in response to the determination of the non-liner region that the output voltage is in a linear region, the switch signal is modulated based on space vector pulse width modulation and in response to the determination of the non-liner region that the output voltage is in a linear region, the switch signal is modulated is modulated based on discontinuous pulse width modulation.

13. The method of claim 11, wherein the space vector modulation signals are generated based on symmetric space vector modulation with the phase voltage command as a reference space vector.

14. The method of claim 11, wherein the determining whether the output voltage of the inverter is in a non-linear region comprises:
determining whether the maximum voltage and the minimum voltage of the space vector modulation signals are included in the predetermined range.

15. The method of claim 11, wherein in response to the determination of the non-linear region that the output voltage of the inverter is in the non-linear region, the terminal voltage command is generated by applying the offset voltage for discontinuous modulation to each of the space vector modulation signals.

16. The method of claim 15, wherein
the offset voltage for discontinuous modulation includes a first offset voltage and a second offset voltage and
in response to the determination of the non-linear region that the output voltage of the inverter is in the non-linear region, the terminal voltage command is generated by alternately applying the first offset voltage and the second offset voltage to each of the space vector modulation signals at 60° phase interval, wherein
the first offset voltage is set to a difference between a voltage of a first DC link of the inverter and a maximum voltage of the space vector modulation signals and the second offset voltage is set to a difference between a voltage of a second DC link of the inverter and a minimum voltage of the space vector modulation signals.

17. The method of claim 15, wherein in response to the determination of the non-linear region that the output voltage of the inverter is in the non-linear region, the terminal voltage command is generated by applying the offset voltage to each of the space vector modulation signals at 120° phase interval, wherein the offset voltage is set to a difference between a voltage of a DC link of the inverter and a maximum voltage or a minimum voltage of the space vector modulation signals.

18. The method of claim 11, further comprising: applying a compensation voltage due to dead time to the space vector modulation signals.

19. The method of claim 11, wherein the control includes modulating the terminal voltage command based on pulse width modulation to output a pulse width modulation signal and outputting a switching signal for controlling the turn-on state of the switch by determining whether or not to limit the pulse width of the pulse width modulation signal according to a minimum pulse width condition.

* * * * *